(12) United States Patent
Chih

(10) Patent No.: US 7,621,501 B2
(45) Date of Patent: Nov. 24, 2009

(54) ELECTRONIC DEVICE AND BASE POSITIONING MECHANISM THEREOF

(75) Inventor: Ting-Hui Chih, Hualien (TW)

(73) Assignee: BenQ Corporation, Taipei (TW)

( * ) Notice: Subject to any disclaimer, the term of this patent is extended or adjusted under 35 U.S.C. 154(b) by 312 days.

(21) Appl. No.: 11/374,113

(22) Filed: Mar. 14, 2006

(65) Prior Publication Data

US 2006/0266894 A1 Nov. 30, 2006

(30) Foreign Application Priority Data

May 24, 2005 (TW) .............................. 94116855 A

(51) Int. Cl.
*F16M 1/00* (2006.01)
(52) U.S. Cl. .................. 248/676; 248/346.01; 248/917
(58) Field of Classification Search .................. 248/121, 248/676, 677, 917, 919, 922–924, 346.01, 248/346.3; 16/277, 280, 285, 306–308, 374, 16/342, 293; 361/679.02, 679.21, 679.22
See application file for complete search history.

(56) References Cited

U.S. PATENT DOCUMENTS

| 5,109,570 | A | * | 5/1992 | Okada et al. | .................. 16/289 |
| 6,078,249 | A | * | 6/2000 | Slavik et al. | ................. 338/180 |
| 6,553,625 | B2 | * | 4/2003 | Lin et al. | ....................... 16/342 |
| 6,671,929 | B1 | * | 1/2004 | Lu | ............................... 16/342 |
| 6,820,307 | B2 | * | 11/2004 | Lu | ............................... 16/342 |
| 2004/0088825 | A1 | * | 5/2004 | Lu | ............................... 16/285 |

* cited by examiner

*Primary Examiner*—Korie Chan

(57) ABSTRACT

An electronic device. The electronic device comprises a main body, a bracket supporting the main body, a shaft rotatably joined with the bracket and comprising a flange, a base joined with the shaft, and a block slidably joined with the shaft and comprising a notch corresponding to the flange. The base is folded by rotation of the shaft. When the shaft rotates to a predetermined angle, the block slides to a first position in which the notch engages the flange to latch the shaft, thereby positioning the base.

18 Claims, 16 Drawing Sheets

ELECTRONIC DEVICE AND BASE POSITIONING MECHANISM THEREOF

BACKGROUND

The invention relates to an electronic device, and in particular to an electronic device, wherein the base thereof can be folded and positioned by a base positioning mechanism.

Electronic devices are typically provided with a base for support. The base is typically fixed thereto and has a wide area. As compact electronic devices are highly required, the wide base can be problematic in storage or shipping.

SUMMARY

An electronic device of the invention comprises a main body, a bracket for supporting the main body, a shaft rotatably joined with the bracket and comprising a flange, a base joined with the shaft, and a block slidably joined with the shaft and comprising a notch corresponding to the flange. The base is folded by rotation of the shaft. When the shaft rotates to a predetermined angle, the block slides to a first position so that the notch is engaged with the flange to latch the shaft, thereby positioning the base.

The electronic device further comprises a push element joined with the block. The push element is pushed to move the block so as to separate the notch from the flange, whereby the shaft is rotatable.

The bracket comprises a bottom cover disposed under the block. The bottom cover comprises a positioning hole, and the block comprises a positioning module. When the block is pushed to a second position by the push element, the positioning module engages the positioning hole to maintain the block in the second position.

The block further comprises a through hole. The positioning module comprises a positioning element disposed in the through hole, a second elastic element disposed in the through hole and biasing the positioning element, and a cover positioning the second elastic element in the through hole.

The bottom cover comprises a groove. The positioning element comprises a guide portion slidably disposed in the groove, a coupler biased by the second elastic element, and a positioning portion joined with the guide portion via the coupler. When the block is pushed to the second position, due to the bias force of the second elastic element on the coupler, the positioning portion is engaged with the positioning hole.

The electronic device further comprises a first elastic element disposed on the shaft and biasing the block to maintain the engagement of the notch and the flange. The first elastic element can be a spring.

BRIEF DESCRIPTION OF THE DRAWINGS

The invention can be more fully understood by reading the subsequent detailed description and examples with references made to the accompanying drawings, wherein:

FIGS. 7b and 7c are cross section along the line B-B of FIG. 7a; and

FIG. 7d is a cross section along the line C-C of FIG. 7a.

DETAILED DESCRIPTION

Figure 1:
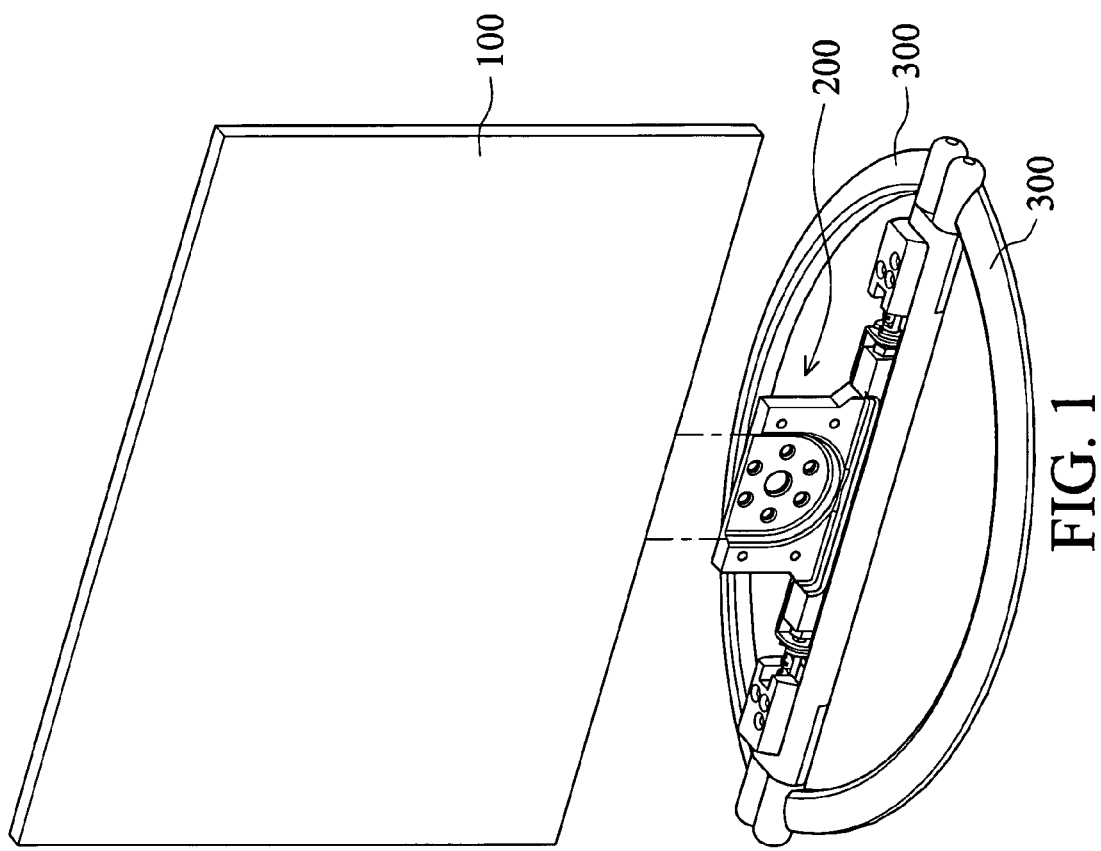
FIG. 1 is a perspective view of an electronic device of the invention.
Figure 2:
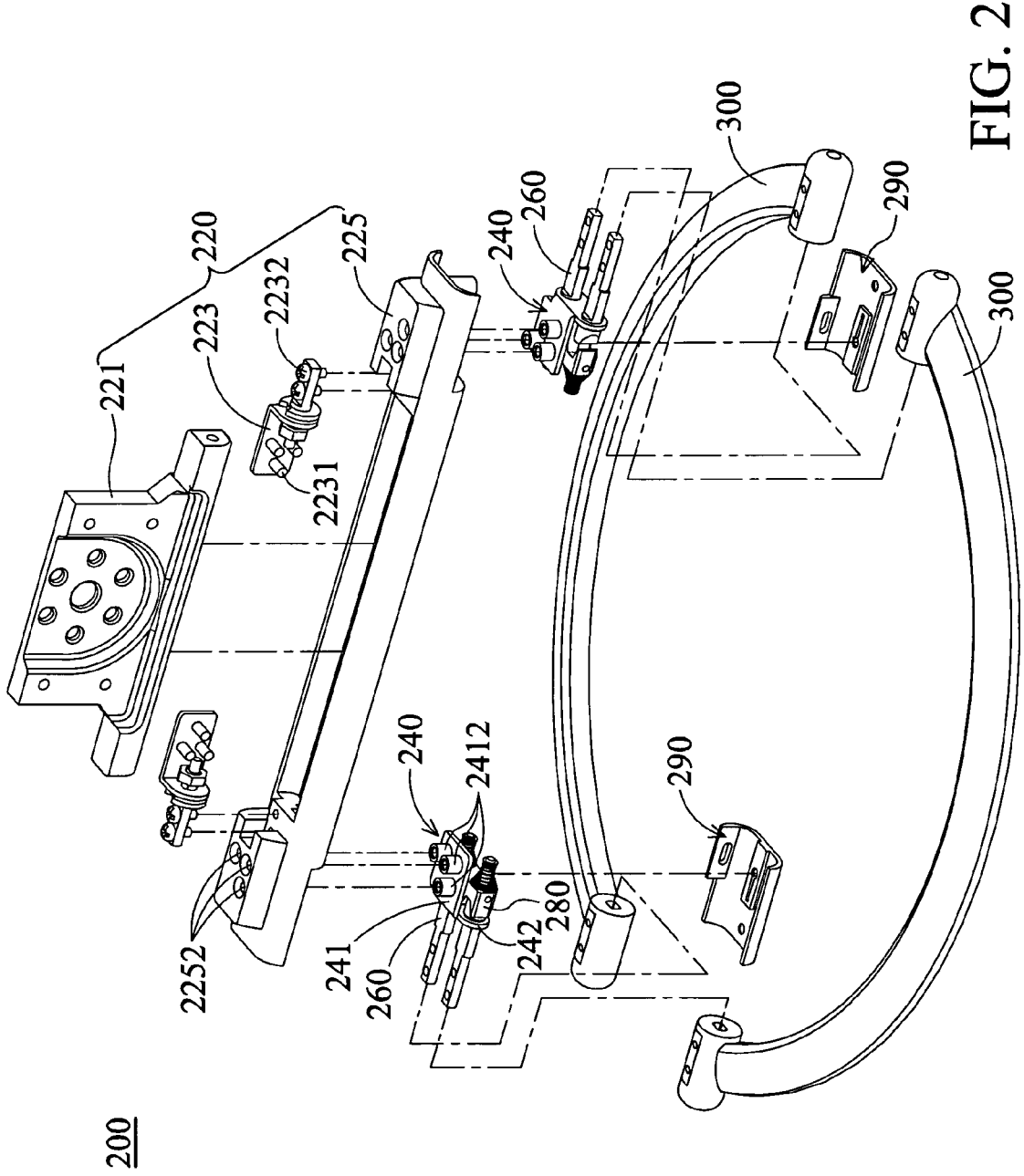
FIGS. 2 and 3 are exploded views of the base positioning mechanism of the invention.
Figure 3:
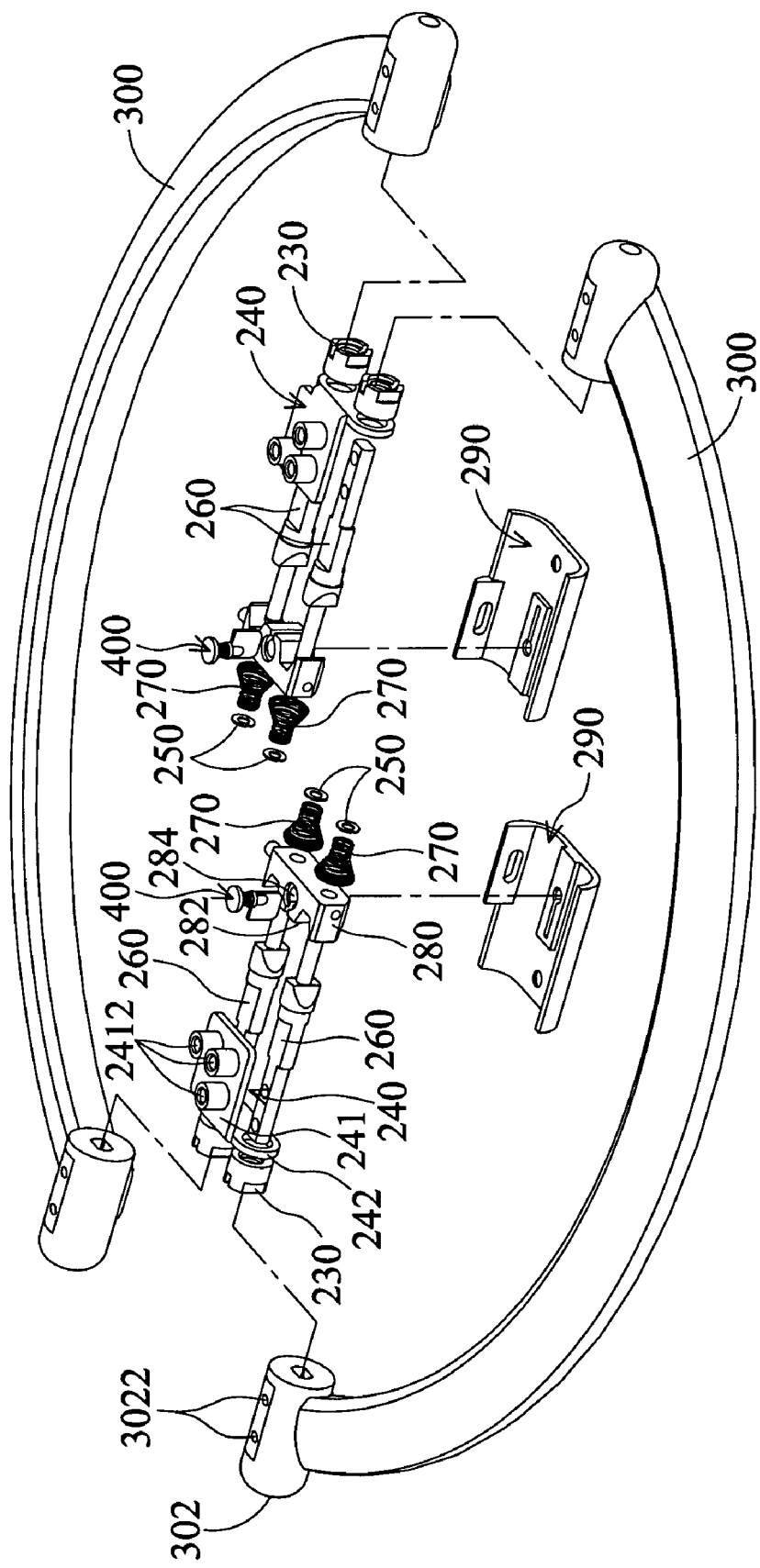
Figure 4:
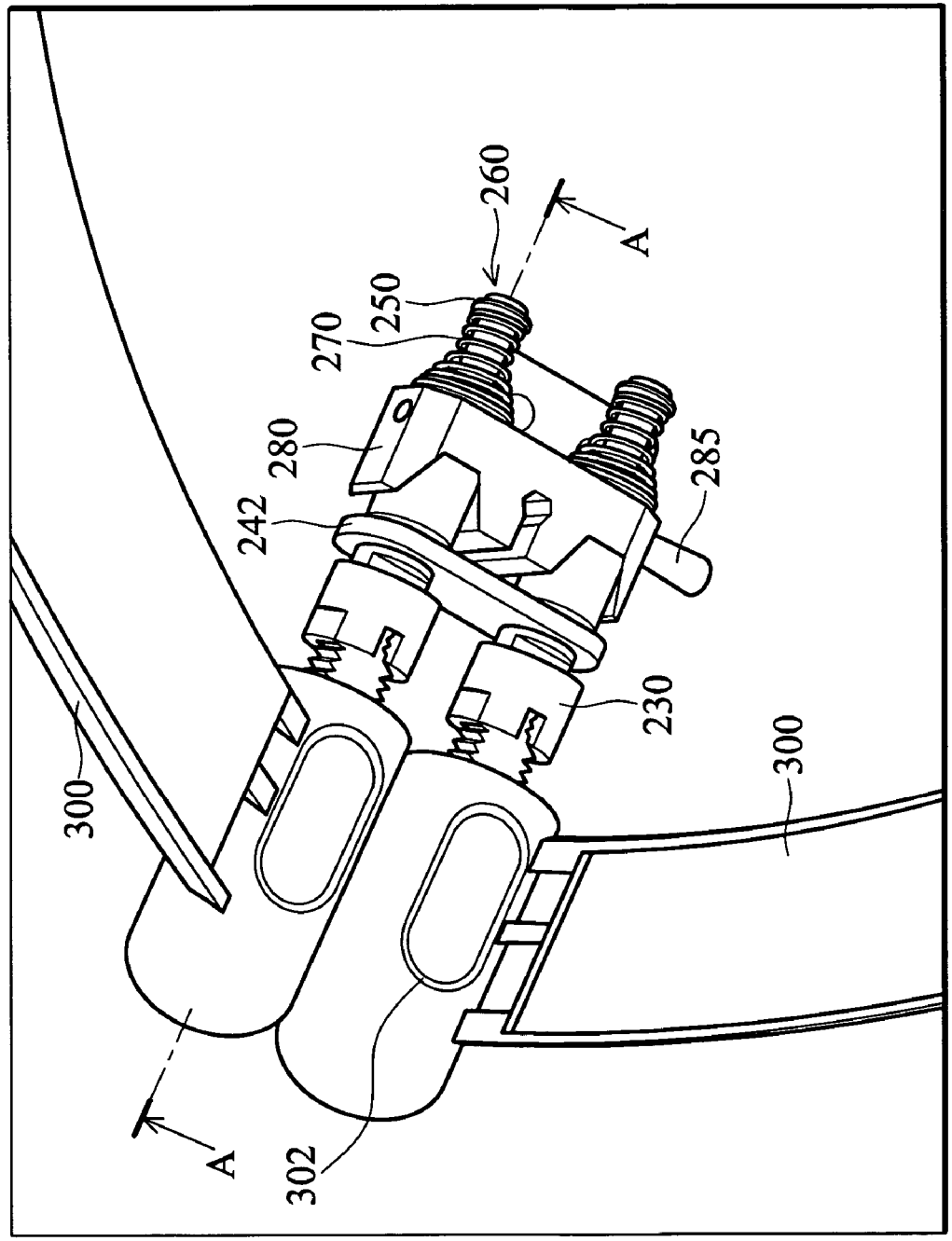
FIG. 4 is a perspective view of the base positioning mechanism of the invention.

Referring to FIG. 1, an electronic device 1000 comprises a main body 100, a positioning mechanism 200 and a base 300. The base 300 supports the main body 100 via the positioning mechanism 200. In FIGS. 2 and 3, the positioning mechanism 200 comprises a support module 220, two brackets 240, four shafts 260, four first elastic elements (compression springs 270), two blocks 280 and two bottom covers 290.

Referring to FIG. 2, the support module 220 comprises a support element 221, two connecting elements 223 and a top cover 225. The support element 221 is joined with the main body 100. Each connecting element 223 is connected to the support element 221 via bolts 2231 and connected to the top cover 225 via bolts 2232. Thus the support element 221 is jointed with the top cover 225 via the connecting element 223.

For the sake of clarity, the support module 220 is omitted in FIG. 3. Each bracket 240 comprises a body 241 and a connecting portion 242. Each body 241 has three screw holes 2412 corresponding to the screw holes 2252 of the top cover 225, whereby the bracket 240 is secured to the top cover 225 via bolts (not shown).

Figure 5:
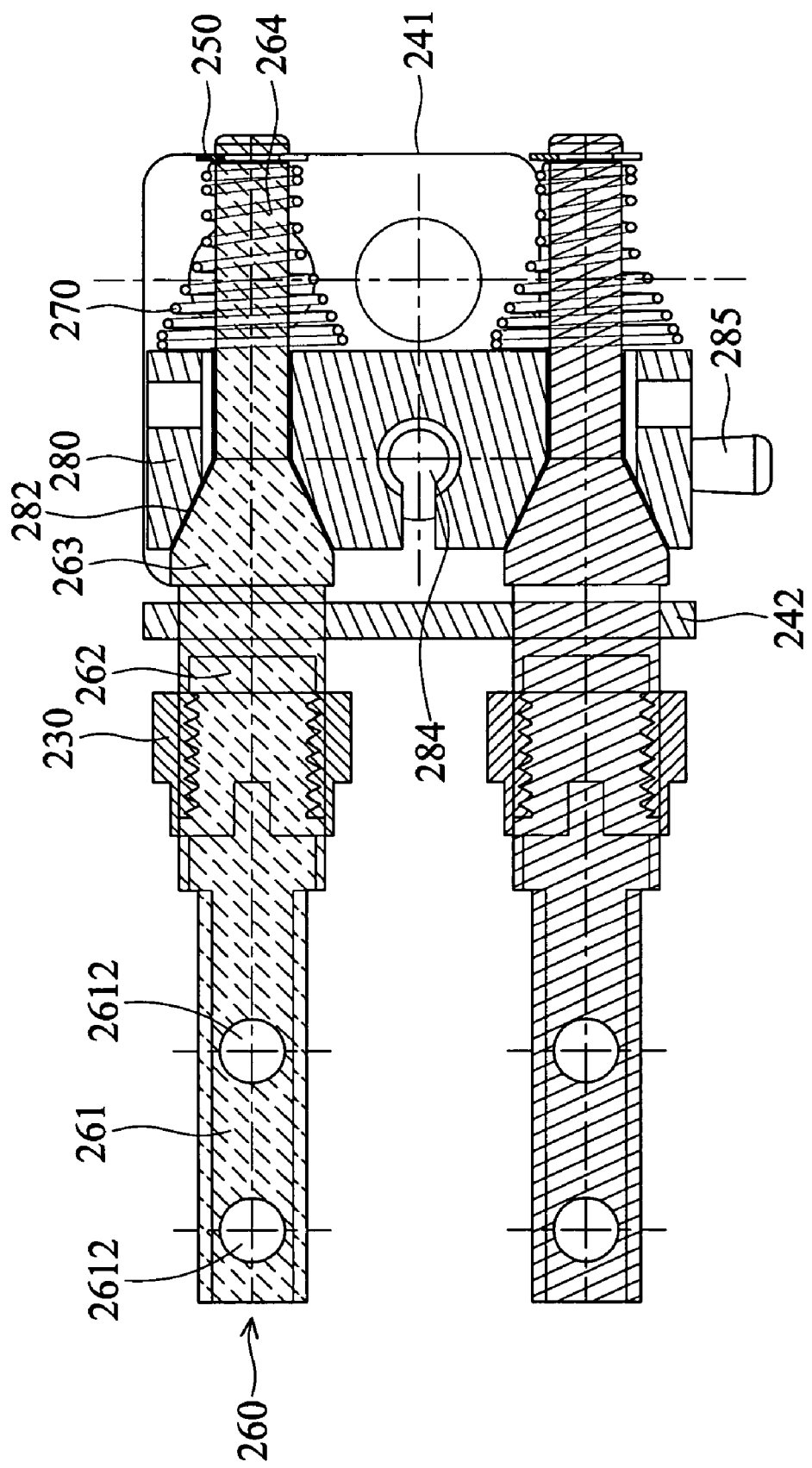
FIG. 5 is a cross section along the line A-A of FIG. 4.

One end of the shaft 260 is connected to the base 300, and bracket 240, block 280 and compression spring 270 are all joined with the other end of the shaft 260. FIG. 5 shows the aforementioned elements joined with the shaft 260.

Referring to FIG. 5, the shaft 260 comprises a first portion 261, a second portion 262, a flange 263 and a third portion 264. The first portion 261 is inserted into a joining portion 302 of the base 300. The first portion 261 has screw holes 2612 corresponding to screw holes 3022 of the joining portion 302 shown in FIG. 3, whereby the shaft 260 is secured to the base 300 via bolts (not shown). When the base 300 is rotated, the shaft 260 is rotated as well. The connecting portion 242 is joined with the second portion 262 and positioned between the bolts 230 and the flange 263. The block 280 is slidably joined with the third portion 264, and the compression spring 270 is also joined with the third portion 264. A C-clamp 250 is engaged with the end of the third portion 264, whereby the compression spring 270 is disposed between C-clamp 250 and the block 280 and biases the block 280. A notch 282 is formed on the block 280, and the flange 263 is tapered and corresponds to the notch 282. When the flange 263 is rotated to a predetermined angle, the notch 282 is engaged with the flange 263 due to the bias force of the compression spring 270 to latch the shaft 260. A push element 285 is disposed on one side of the block 280. By pushing the push element 285 against the bias force of the compression spring 270, the block 280 can be separated from the flange 263. At this time, the shaft is rotatable again.

Accordingly, as the base 300 is joined with the shaft 260, when the block 280 is engaged with the flange 263 to latch the shaft 260, the base 300 is positioned. When the block 280 is separated from the flange 263, the base 300 can be folded by rotation of the shaft 260.

Figure 6A:
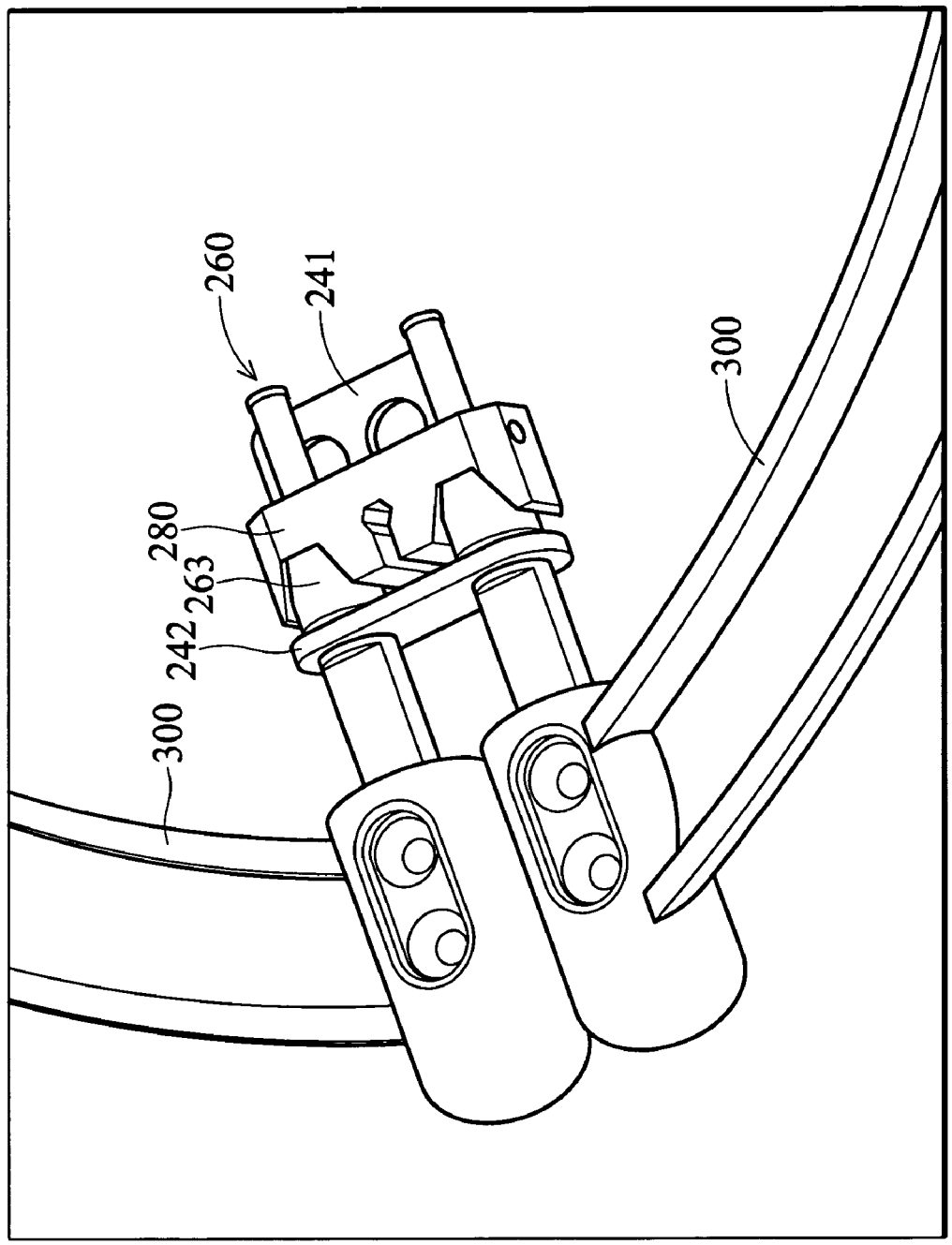
FIGS. 6a to 6g depict steps of folding the base.
Figure 6B:
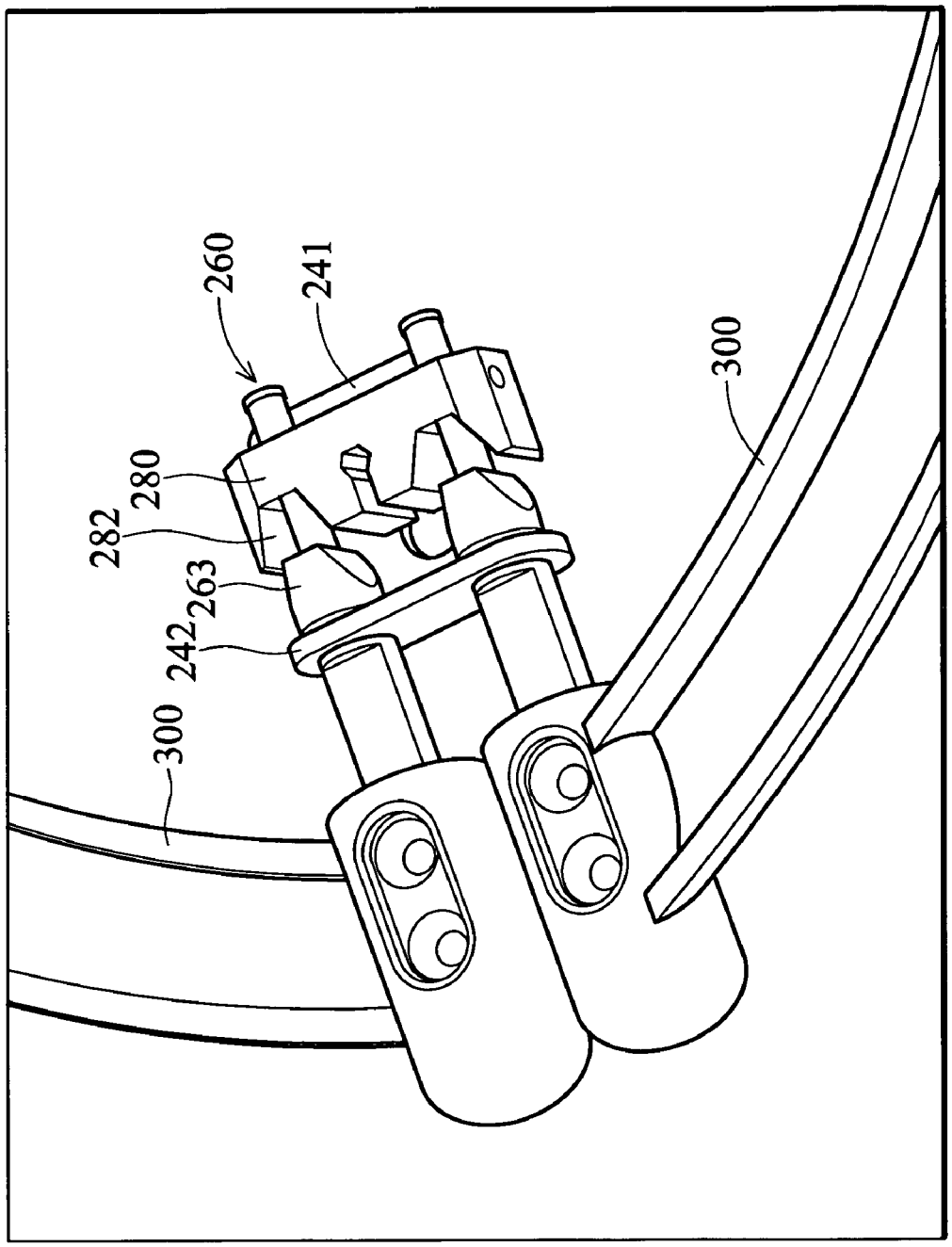
Figure 6C:
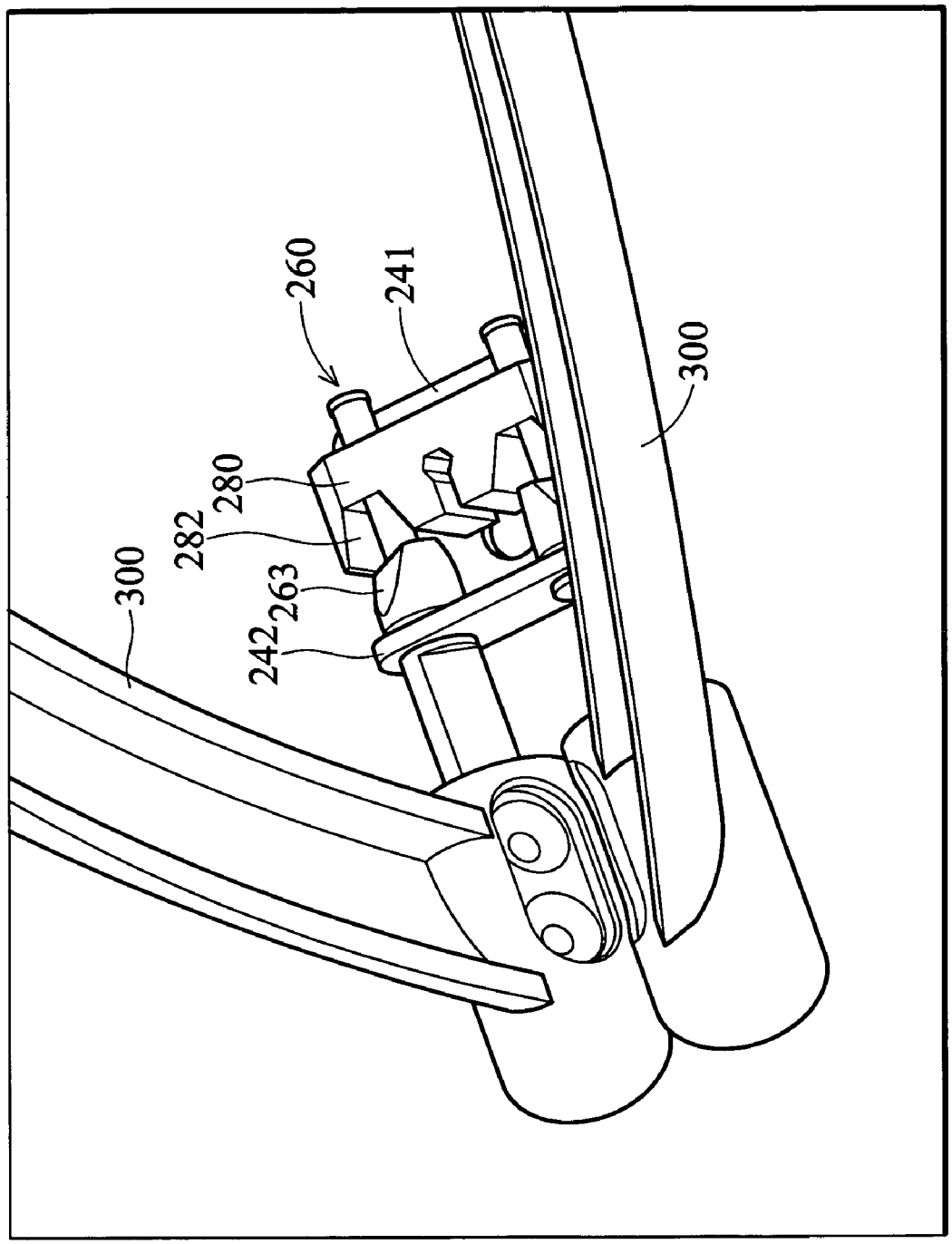
Figure 6D:
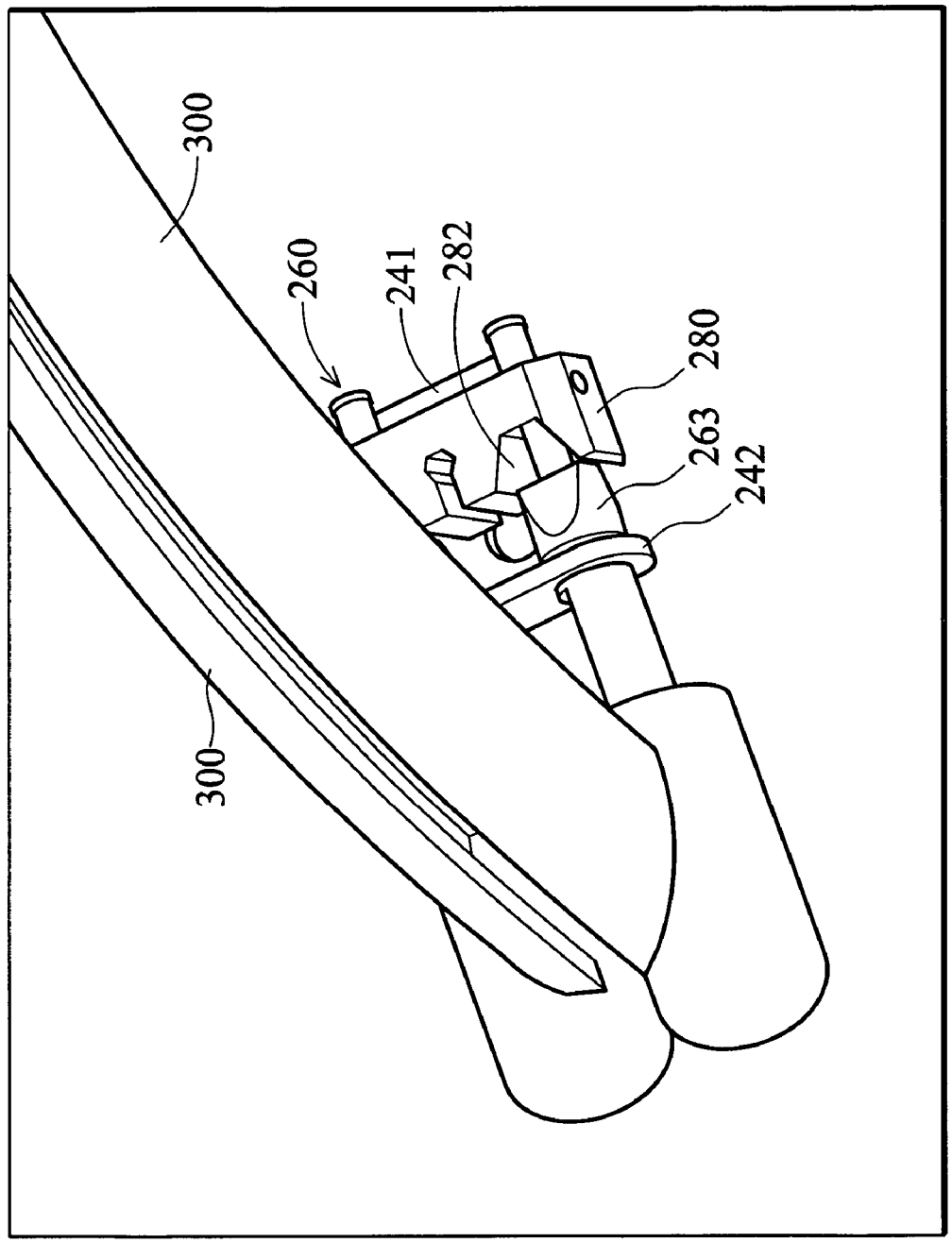
Figure 6E:
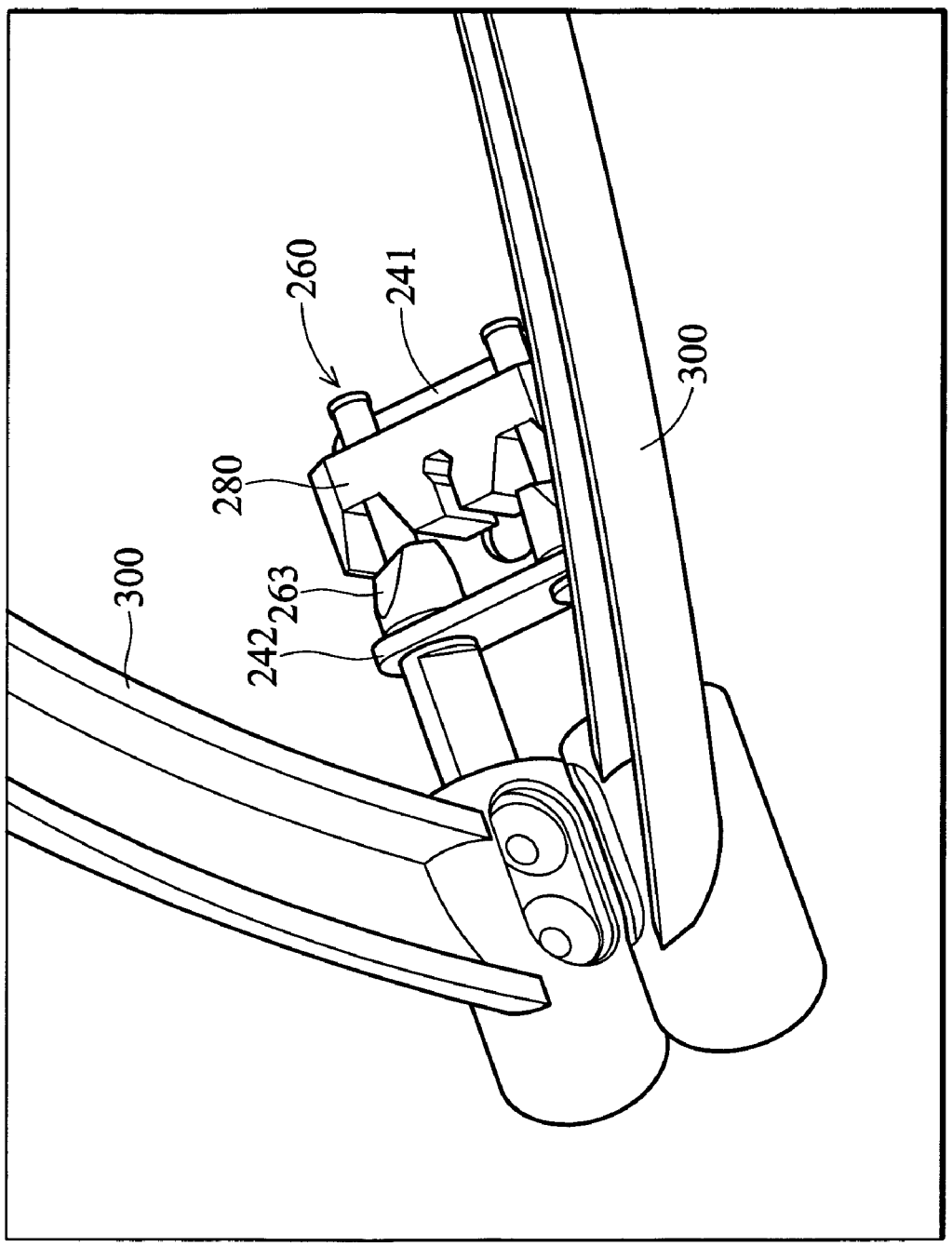
Figure 6F:
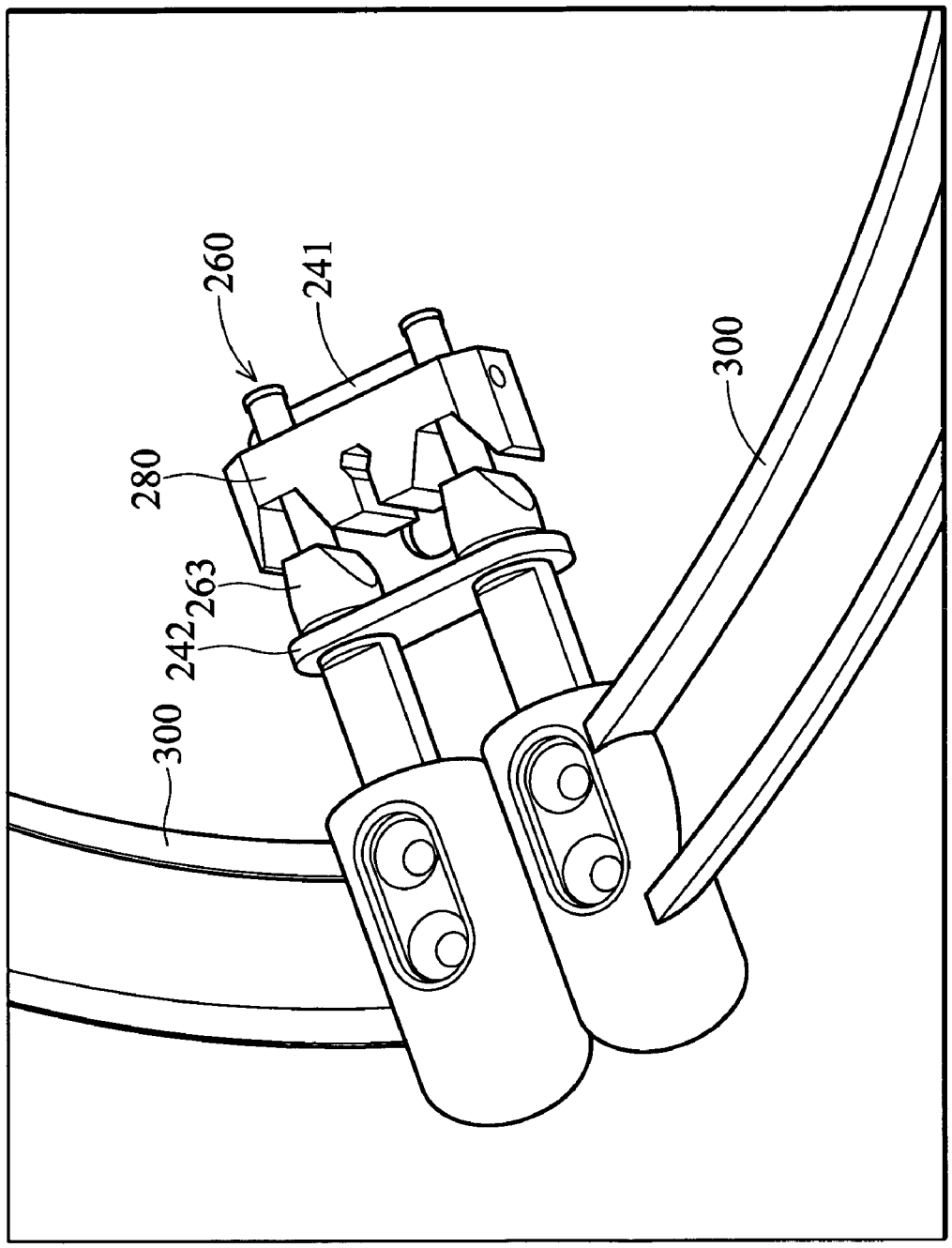
Figure 6G:
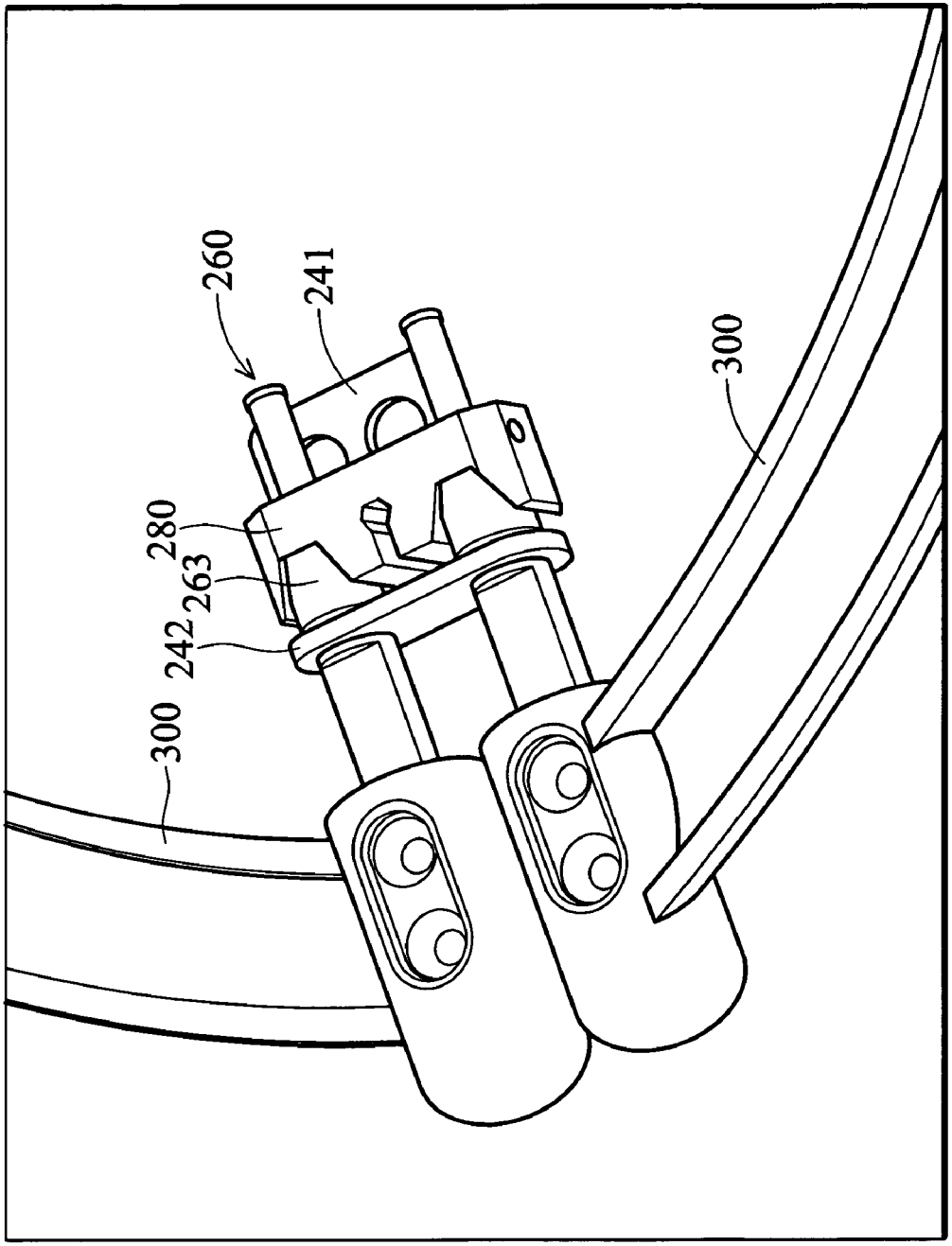

FIGS. 6a to 6g are bottom views of the electronic device 1000 depicting steps of folding the base 300. In FIG. 6a, when the block 280 is engaged with the flange 263, the block 280 is in a first position, and the base 300 is positioned. Hence, the electronic device 1000 can be placed on a table. In FIGS. 6b to 6d, when the block 280 is separated from the flange 263 and moved to a second position, the base 300 can be folded. The folded base 300 can serve as a handle to easily carry the electronic device 1000. Further, because the flange 263 is so rotated when the shaft 260 is rotated that the flange 263 is no longer engaged with the notch 282, the shaft 260 remains rotatable. In FIGS. 6e to 6g, when the folded base 300 is stretched gradually, the flange 263 is finally rotated to the predetermined angle, and the block 280 moves from the second position to the first position so as to be engaged with the flange 263. At this time, the shaft 260 cannot rotate, and the base 300 is positioned.

In addition, when the block 280 is moved to the second position, it is required to keep pushing the block 280 against the compression spring 270 and to fold the base 300 simultaneously. Thus it would be better that a positioning module 400 is disposed in the block 280 as shown in FIGS. 7a to 7d. When the block 280 is moved to the second position, the positioning module 400 maintains the block 280 in the second position, and thereby the base 300 is easily folded.

Figure 7A:
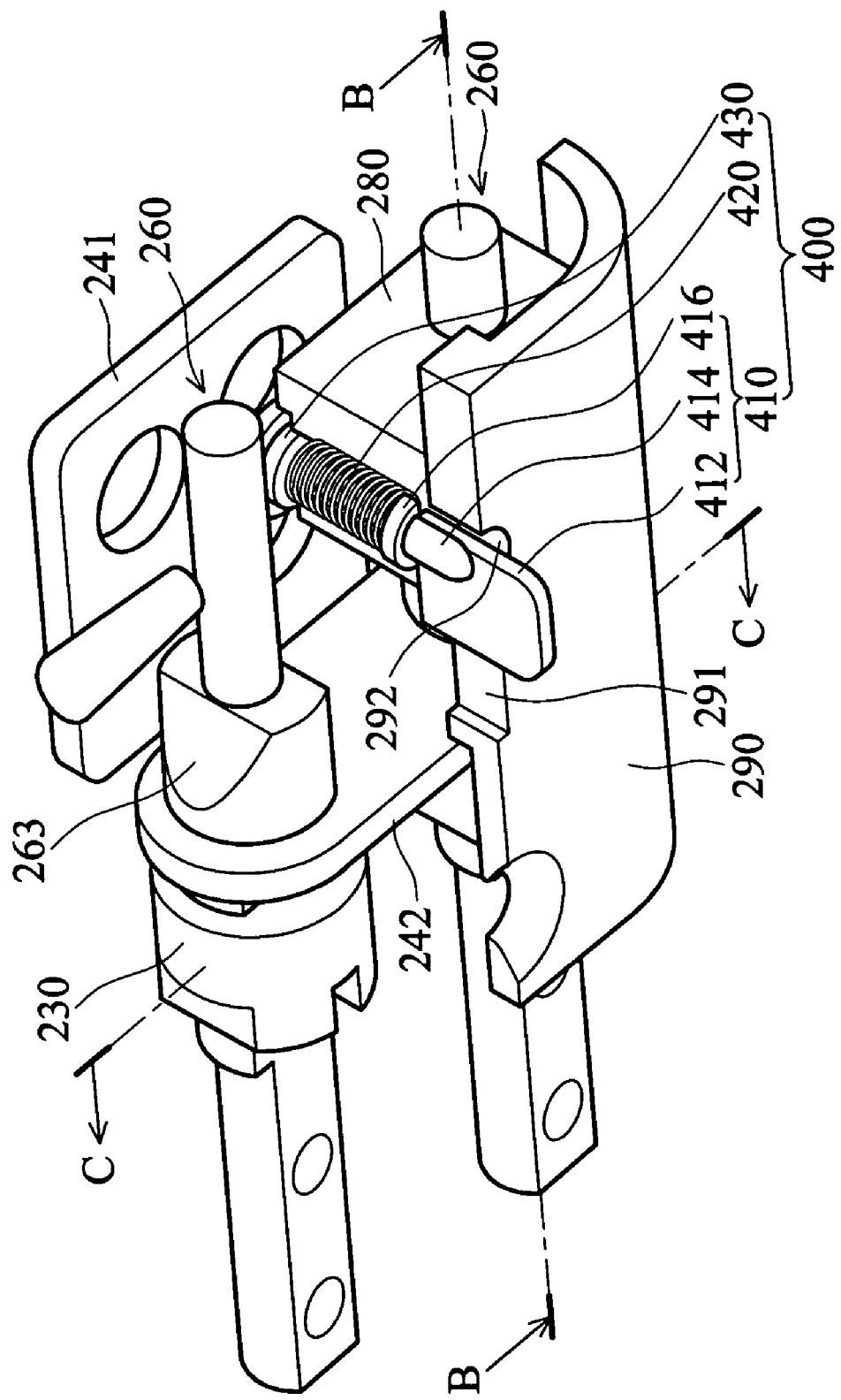
FIG. 7a is a perspective view of the base positioning mechanism.
Figure 7B:
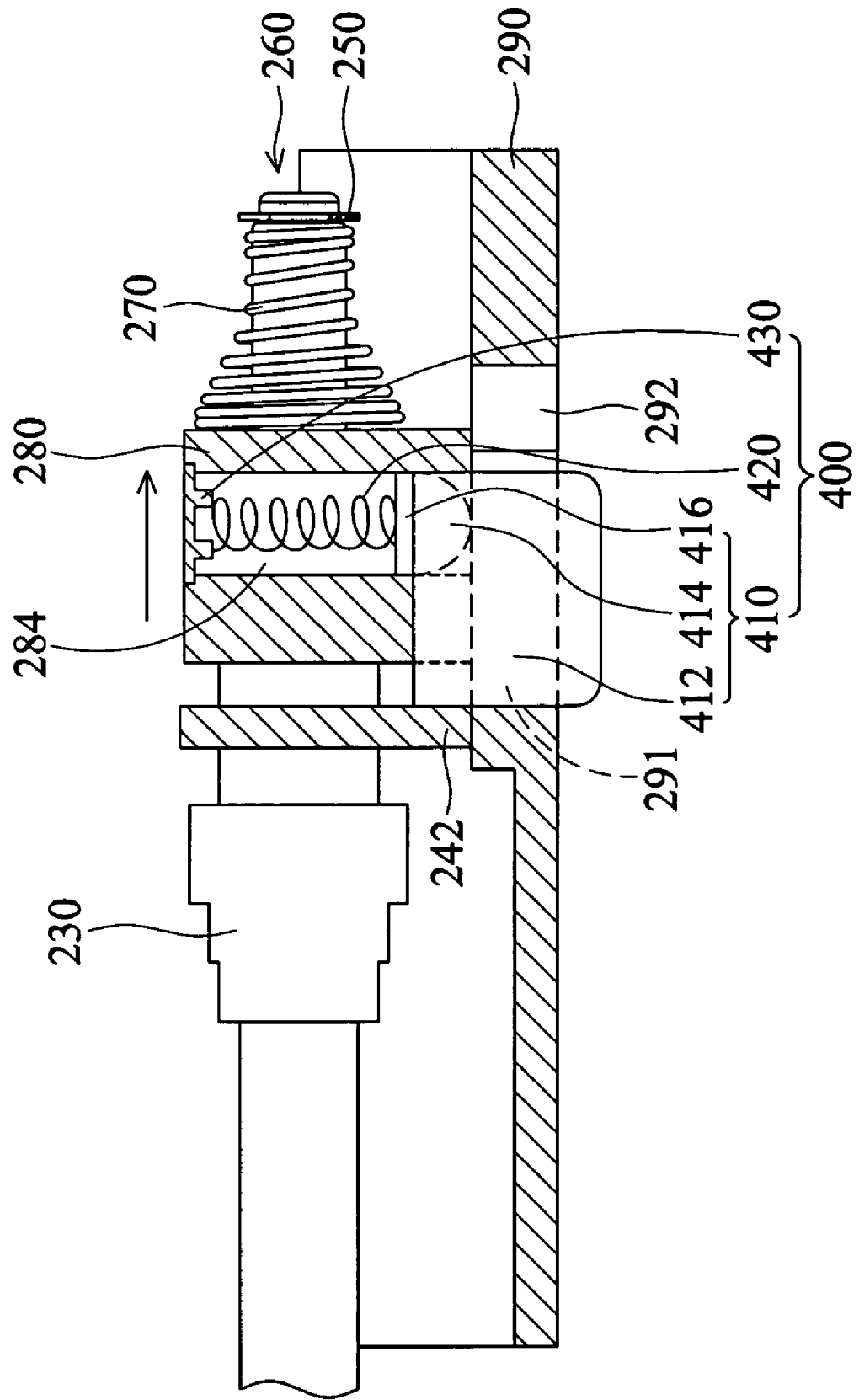
Figure 7C:
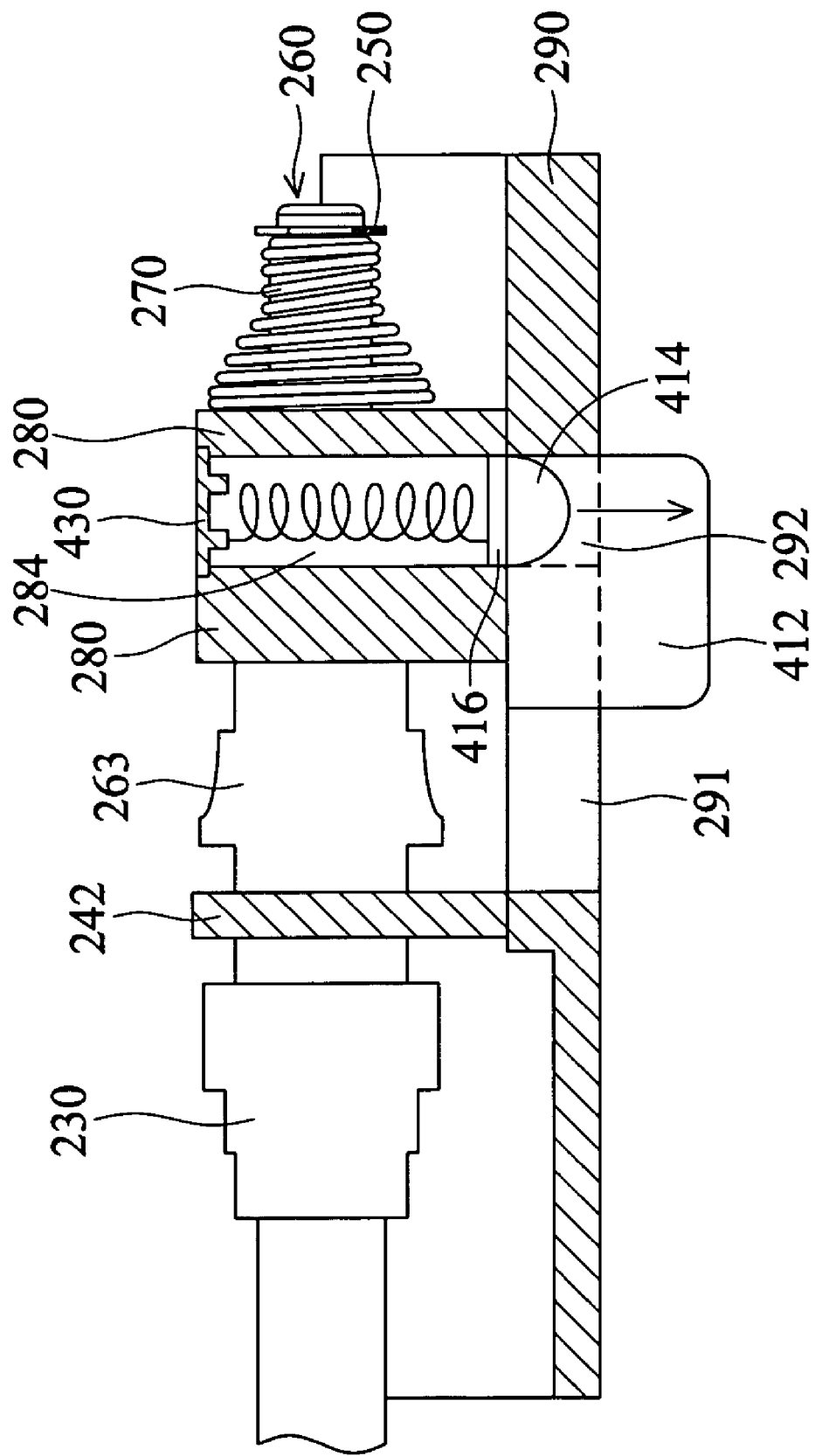
Figure 7D:
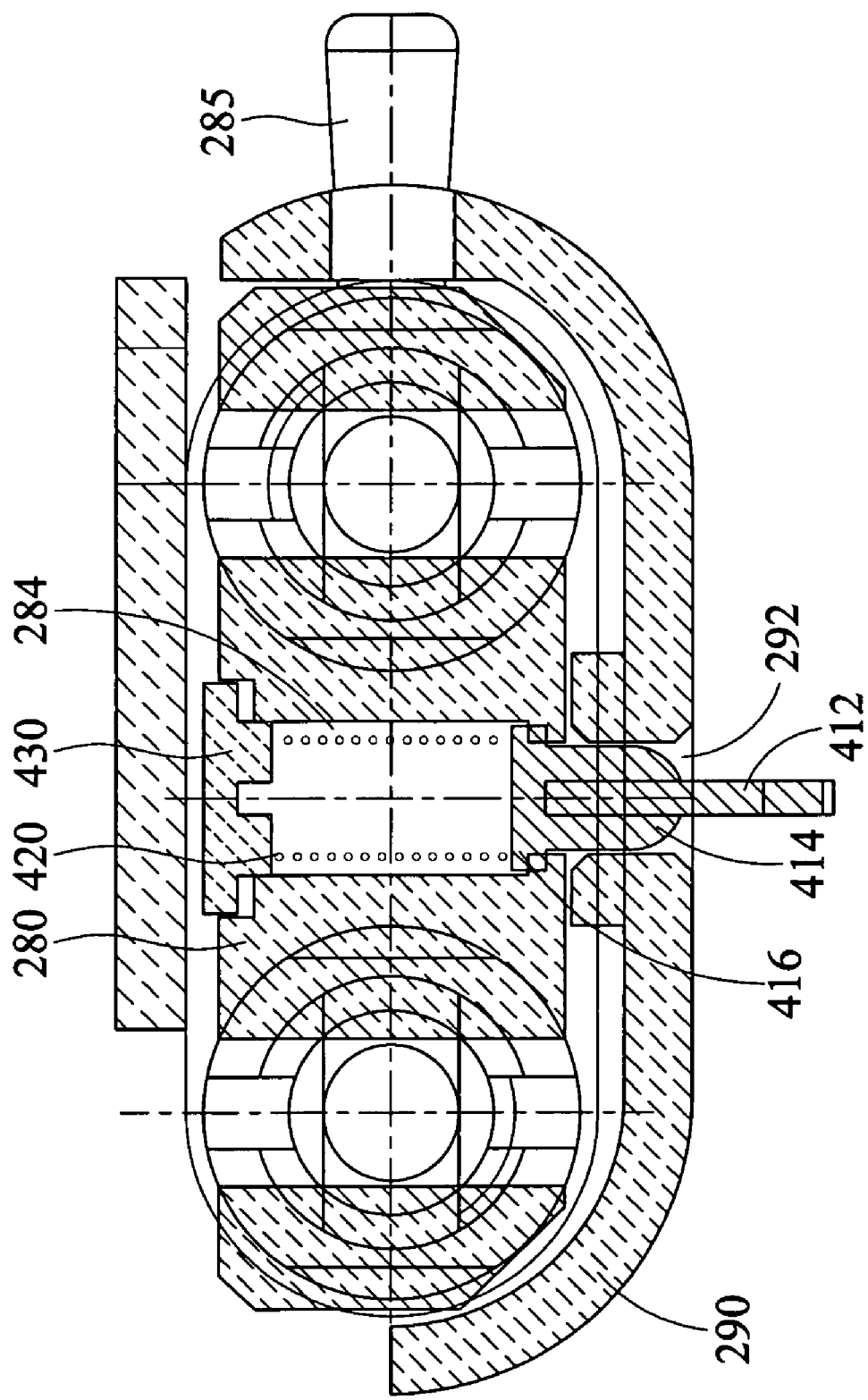

FIG. 7a depicts the positioning module 400. FIGS. 7b and 7c are cross sections along line B-B of FIG. 7a, wherein FIG. 7b depicts the block 280 in the first position and FIG. 7c depicts the block 280 in the second position. FIG. 7d is a cross section along line C-C of FIG. 7a. The positioning module 400 comprises a positioning element 410, a second elastic element (compression spring 420) and a cover 430. A through hole 284 is formed in the block 280, and the positioning element 410 has a flat guide portion 412, a cylindrical positioning portion 414 with curved front and a coupler 416. The guide portion 412 is connected to the positioning portion 414 via the coupler 416. The positioning portion 414 is slidably disposed in the through hole 284 via the coupler 416. The compression spring 420 disposed in the through hole 284 biases the coupler 416. Guide portion 412, positioning portion 414 and coupler 416 can be formed integrally. The cover 430 maintains the compression spring 420 in the through hole 284. The bottom cover 290 comprises a groove 291 and a positioning hole 292. In FIG. 7b, when the block 280 is in the first position, the guide portion 412 is inserted into the groove 291 and the positioning portion 414 abuts the bottom cover 290. In FIG. 7c, when the block 280 is moved to the second position, the positioning portion 414 falls into the positioning hole 292. At this time, the positioning portion 414 is positioned in the positioning hole 292 due to the bias force of the compression spring 420 on the positioning portion 414. Further because of the bias force of the compression spring 270 on the block 280, the block 280 is accordingly positioned in the second position, whereby the base 300 is easily folded. When one intends to move the block 280 back to the first position, he only needs to push the guide portion 412 of the positioning element 410 against the compression spring 420 and enable the positioning portion 414 to separate from the positioning hole 292. The block 280 is moved to the first position by the bias force of the compression spring 270.

In this embodiment, although two positioning mechanisms 200 are disposed on opposite sides of the base 300, one positioning mechanism 200 disposed on one side of the base 300 is also applicable.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A positioning mechanism of a base, comprising:
   a bracket;
   a shaft rotatably joined with the bracket and comprising a flange, the base being joined with the shaft;
   a block slidably joined with the shaft and comprising a notch corresponding to the flange; and
   a push element joined with the block;
   wherein when the push element is pushed to move the block so as to separate the notch from the flange, the shaft is rotatable, the base is folded by rotating the shaft, when the shaft rotates to a predetermined angle, the block is moved to a first position so that the notch is engaged with the flange to latch the shaft, whereby the base is positioned.

2. The positioning mechanism as claimed in claim 1, wherein the bracket comprises a bottom cover disposed under the block, the bottom cover comprises a positioning hole, the block comprises a positioning module, and when the block is pushed to a second position by the push element, the positioning module is engaged with the positioning hole to maintain the block in the second position.

3. The positioning mechanism as claimed in claim 2, wherein the block further comprises a through hole, and the positioning module comprises:
   a positioning element disposed in the through hole;
   a second elastic element disposed in the through hole and biasing the positioning element; and
   a cover positioning the second elastic element in the through hole.

4. The positioning mechanism as claimed in claim 3, wherein the bottom cover comprises a groove and the positioning element comprises:
   a guide portion slidably disposed in the groove;
   a coupler biased by the second elastic element; and
   a positioning portion joined with the guide portion via the coupler, wherein when the block is pushed to the second position, due to the bias force of the second elastic element on the coupler, the positioning portion engages is engaged with the positioning hole.

5. The positioning mechanism as claimed in claim 1 further comprising a first elastic element disposed on the shaft and biasing the block to maintain the engagement of the notch and the flange.

6. The positioning mechanism as claimed in claim 5, further comprising a push element joined with the block and for moving the block against the first elastic element so that the notch is separated from the flange and the shaft is rotatable.

7. The positioning mechanism as claimed in claim 6, wherein the bracket comprises a bottom cover disposed under the block, the bottom cover comprises a positioning hole, the block comprises a positioning module, and when the block is pushed to a second position by the push element, the positioning module is engaged with the positioning hole to maintain the block in the second position.

8. The positioning mechanism as claimed in claim 7, wherein the block further comprises a through hole, and the positioning module comprises:
   a positioning element disposed in the through hole;
   a second elastic element disposed in the through hole and biasing the positioning element; and
   a cover positioning the second elastic element in the through hole.

9. The positioning mechanism as claimed in claim 8, wherein the bottom cover comprises a groove and the positioning element comprises:

a guide portion slidably disposed in the groove;

a coupler biased by the second elastic element; and a positioning portion joined with the guide portion via the coupler, wherein when the block is pushed to the second position, due to the bias force of the second elastic element on the coupler, the positioning portion is engaged with the positioning hole.

10. An electronic device, comprising:

a main body;

a bracket supporting the main body;

a shaft rotatably joined with the bracket and comprising a flange;

a base joined with the shaft;

a block slidably joined with the shaft and comprising a notch corresponding to the flange; and a push element joined with the block;

wherein when the push element is pushed to move the block so as to separate the notch from the flange, the shaft is rotatable, the base is folded by rotating the shaft, and when the shaft rotates to a predetermined angle, the block is moved to a first position so that the notch is engaged with the flange to latch the shaft, and whereby the base is positioned.

11. The electronic device as claimed in claim 10, wherein the bracket comprises a bottom cover disposed under the block, the bottom cover comprises a positioning hole, the block comprises a positioning module, and when the block is pushed to a second position by the push element, the positioning module is engaged with the positioning hole to maintain the block in the second position.

12. The electronic device as claimed in claim 11, wherein the block further comprises a through hole, and the positioning module comprises:

a positioning element disposed in the through hole;

a second elastic element disposed in the through hole and biasing the positioning element; and a cover positioning the second elastic element in the through hole.

13. The electronic device as claimed in claim 12, wherein the bottom cover comprises a groove and the positioning element comprises:

a guide portion slidably disposed in the groove;

a coupler biased by the second elastic element; and a positioning portion joined with the guide portion via the coupler, wherein when the block is pushed to the second position, due to the bias force of the second elastic element on the coupler, the positioning portion is engaged with the positioning hole.

14. The electronic device as claimed in claim 10, further comprising a first elastic element disposed on the shaft and biasing the block to maintain the engagement of the notch and the flange.

15. The electronic device as claimed in claim 14, further comprising a push element joined with the block and for moving the block against the first elastic element so that the notch is separated from the flange and the shaft is rotatable.

16. The electronic device as claimed in claim 15, wherein the bracket comprises a bottom cover disposed under the block, the bottom cover comprises a positioning hole, the block comprises a positioning module, and when the block is pushed to a second position by the push element, the positioning module is engaged with the positioning hole to maintain the block in the second position.

17. The electronic device as claimed in claim 16, wherein the block further comprises a through hole, and the positioning module comprises:

a positioning element disposed in the through hole;

a second elastic element disposed in the through hole and biasing the positioning element; and a cover positioning the second elastic element in the through hole.

18. The electronic device as claimed in claim 17, wherein the bottom cover comprises a groove and the positioning element comprises:

a guide portion slidably disposed in the groove;

a coupler biased by the second elastic element; and a positioning portion joined with the guide portion via the coupler, wherein when the block is pushed to the second position, due to the bias force of the second elastic element on the coupler, the positioning portion is engaged with the positioning hole.

* * * * *

UNITED STATES PATENT AND TRADEMARK OFFICE
CERTIFICATE OF CORRECTION

PATENT NO.       : 7,621,501 B2                                         Page 1 of 1
APPLICATION NO.  : 11/374113
DATED            : November 24, 2009
INVENTOR(S)      : Ting-Hui Chih It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 567 days.

Signed and Sealed this

Fourteenth Day of December, 2010

David J. Kappos
*Director of the United States Patent and Trademark Office*